(12) United States Patent
Cormode et al.

(10) Patent No.: US 8,386,534 B2
(45) Date of Patent: Feb. 26, 2013

(54) AUTOMATIC GLEANING OF SEMANTIC INFORMATION IN SOCIAL NETWORKS

(75) Inventors: Graham Cormode, Morristown, NJ (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1042 days.

(21) Appl. No.: 12/290,449

(22) Filed: Oct. 30, 2008

(65) Prior Publication Data

US 2010/0114989 A1     May 6, 2010

(51) Int. Cl.
 *G06F 7/00* (2006.01)
 *G06F 17/30* (2006.01)
 *G06F 15/16* (2006.01)
(52) U.S. Cl. ........ 707/808; 707/732; 707/760; 707/770; 709/202
(58) Field of Classification Search .................. 707/3, 5, 707/760, 808, 732, 770; 709/202
See application file for complete search history.

(56) References Cited

U.S. PATENT DOCUMENTS

| | | | |
|---|---|---|---|
| 7,016,307 B2 | 3/2006 | Vasudev et al. | |
| 7,117,254 B2 | 10/2006 | Lunt et al. | |
| 7,188,153 B2 | 3/2007 | Lunt et al. | |
| 7,222,187 B2 | 5/2007 | Yeager et al. | |
| 7,269,590 B2 | 9/2007 | Hull et al. | |
| 7,359,894 B1 | 4/2008 | Liebman et al. | |
| 7,702,685 B2 * | 4/2010 | Shrufi et al. | 707/760 |
| 7,725,525 B2 * | 5/2010 | Work | 709/202 |
| 7,788,260 B2 * | 8/2010 | Lunt et al. | 707/727 |
| 2004/0148275 A1 * | 7/2004 | Achlioptas | 707/3 |
| 2005/0201290 A1 | 9/2005 | Vasudev et al. | |
| 2006/0042483 A1 * | 3/2006 | Work et al. | 101/91 |
| 2006/0122974 A1 * | 6/2006 | Perisic | 707/3 |
| 2007/0260599 A1 * | 11/2007 | McGuire et al. | 707/5 |
| 2008/0059576 A1 | 3/2008 | Liu et al. | |
| 2008/0104495 A1 * | 5/2008 | Craig | 715/205 |
| 2008/0134053 A1 | 6/2008 | Fischer | |
| 2009/0132365 A1 * | 5/2009 | Gruenhagen et al. | 705/14 |

* cited by examiner

*Primary Examiner* — Apu Mofiz
*Assistant Examiner* — Chelcie Daye

(57) ABSTRACT

Disclosed are method and apparatus for identifying members of a social network who have a high likelihood of providing a useful response to a query. A query engine examines the personal pages of a set of members and automatically gleans semantic information relevant to the query. From the automatically-gleaned semantic information, a score indicative of the likelihood that the member may provide a useful response is calculated.

21 Claims, 9 Drawing Sheets

AUTOMATIC GLEANING OF SEMANTIC INFORMATION IN SOCIAL NETWORKS

BACKGROUND OF THE INVENTION

The present invention relates generally to information retrieval, and more particularly to automatic gleaning of semantic information in social networks.

Information searching and retrieval are powerful functions provided by the Internet. Standard search engines may efficiently and accurately retrieve specific objective information (such as, for example, the atomic mass of plutonium, the melting point of indium, the capital of Denmark, and the location of Stonehenge). Much of the information which users search for on the Internet, however, is subjective; for example, evaluation of restaurants, rating of hotels, and lists of interesting sites to visit in Sweden. Subjective information is by nature ill-defined, and information searches need to be approached cautiously. Recommendations for restaurants and hotels, for example, abound on the World Wide Web: online magazines, forums, and blogs are popular sources. For a specific individual, however, much of this information may not be useful. One issue is the trustworthiness of the source of the information; for example, a restaurant owner may publish a glowing review of his own restaurant. A significant issue, however, is that personal tastes may vary widely from one individual to another. Recommendations from a connoisseur frequenting 4-star restaurants are of little relevance to someone hunting for a good pizza joint (and vice-versa). The overall context of a query and response is an important factor when searching for relevant information.

Social networking sites, with millions of members from around the globe, may serve as rich information sources, especially for subjective information. Specialized groups may potentially serve as focussed information sources. To find an answer to a query for subjective information, it is often helpful for a member seeking the information to directly contact other members who may be knowledgeable in the subject. Direct contact is advantageous since interactive discussion may be needed to clarify the information being sought and to establish the background of the member supplying the information. Broadcasting a query to all members of a social network is inefficient and, in general, prohibited by social networking sites. What are needed are method and apparatus for efficiently identifying members of a social network who may be sources of relevant information.

BRIEF SUMMARY OF THE INVENTION

In an embodiment, a set of candidates who may provide a useful response to a query is generated by automatically gleaning semantic information relevant to the query from the personal pages of a set of members of a social network. A score characterizing the likelihood that the member may provide a useful response is calculated from the semantic information automatically gleaned from the personal page associated with the member.

These and other advantages of the invention will be apparent to those of ordinary skill in the art by reference to the following detailed description and the accompanying drawings.

DETAILED DESCRIPTION

Figure 1:
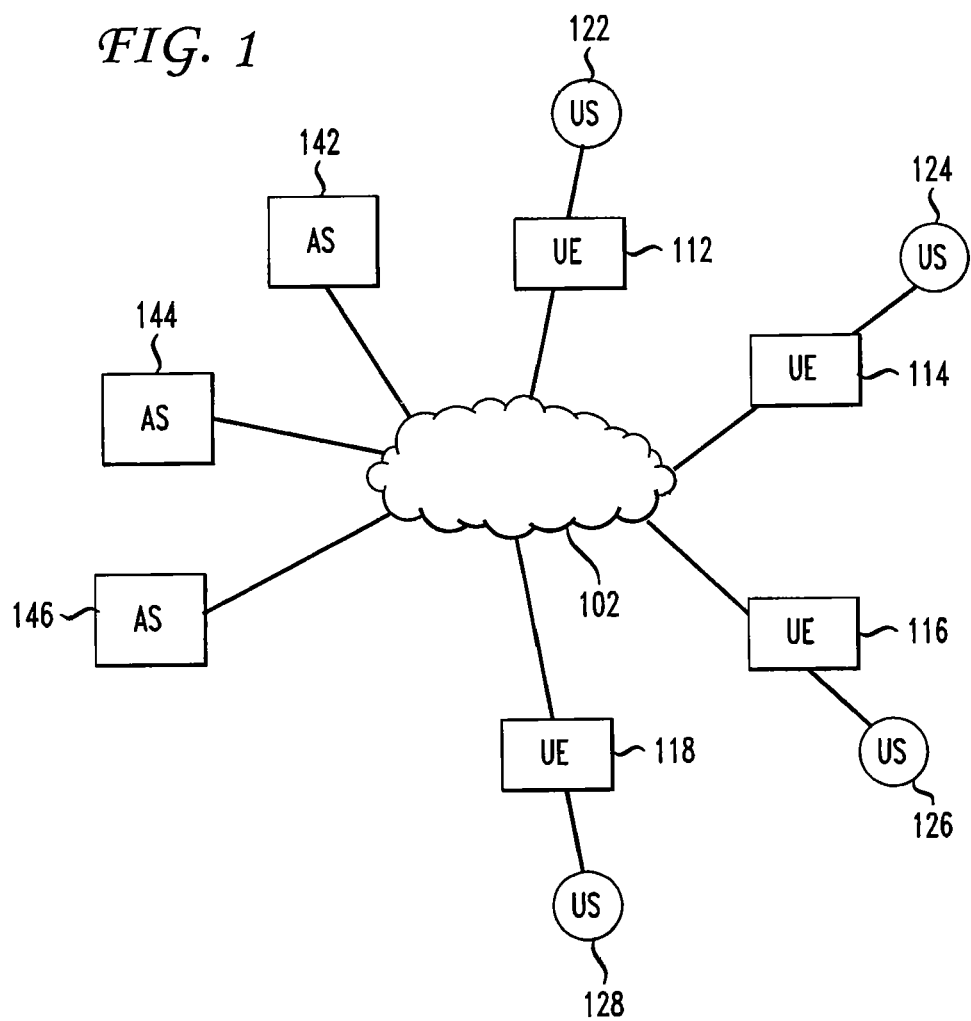
FIG. 1 shows a schematic of a communications network.

FIG. 1 shows a high-level schematic of an example of a communications network that serves as the infrastructure for supporting an online social network. A communications network includes the network equipment, network operations software, and communications links for users to communicate with each other and for users to access applications. Users US 122-US 128 connect to core network 102 via user equipment UE 112-UE 118, respectively. A personal computer (PC) is an example of user equipment. Application servers AS 142-AS 146 may provide user services such as e-mail, multi-media file transfer, and information search. Application servers AS 142-AS 146 may also host customer service sites, such as websites on the Internet, including online social networking sites.

An online social networking site provides software applications by which users may form an online social network. Herein, an online social network refers to a virtual community of interest. To simplify the terminology herein, an online social network is referred to as a social network, and an online social networking site is referred to as a social networking site. Users join a social network and thereby become members of the social network. Users join a social network by subscribing to the services of a social networking site, which may be hosted on an application server such as AS 142. Herein, members are associated with a social network and associated with a corresponding social networking site.

Figure 2:
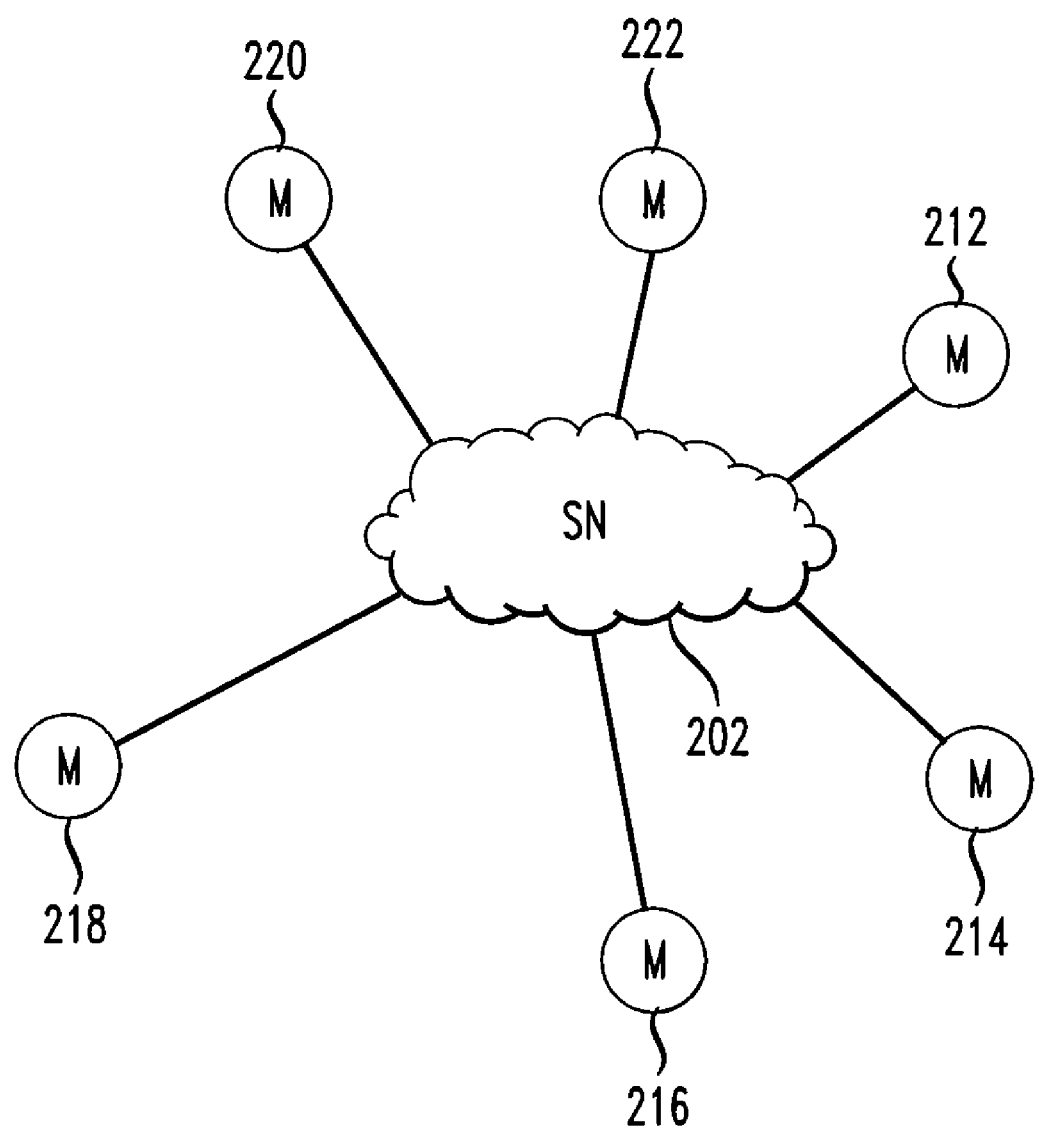
FIG. 2 shows a schematic of a social network.

FIG. 2 shows a high-level view of a social network. Various members, such as M 212-M 222, may interact with each other via social networking site SN 202. For example, members may send messages, play games, share music and movies, describe their vacation trips, and join in group discussions. Various degrees of association may exist between specific members. For example members may belong to a group. A group is a subset of members of a social network which share a common association. For example, a group may be alumni of the same school, fans of the same musician, or volunteers for the same charity. In some instances, membership in a group is open to all members of the social network. In other instances, a member of the social network needs to apply to a group administrator to receive permission to join the group.

Figure 3:
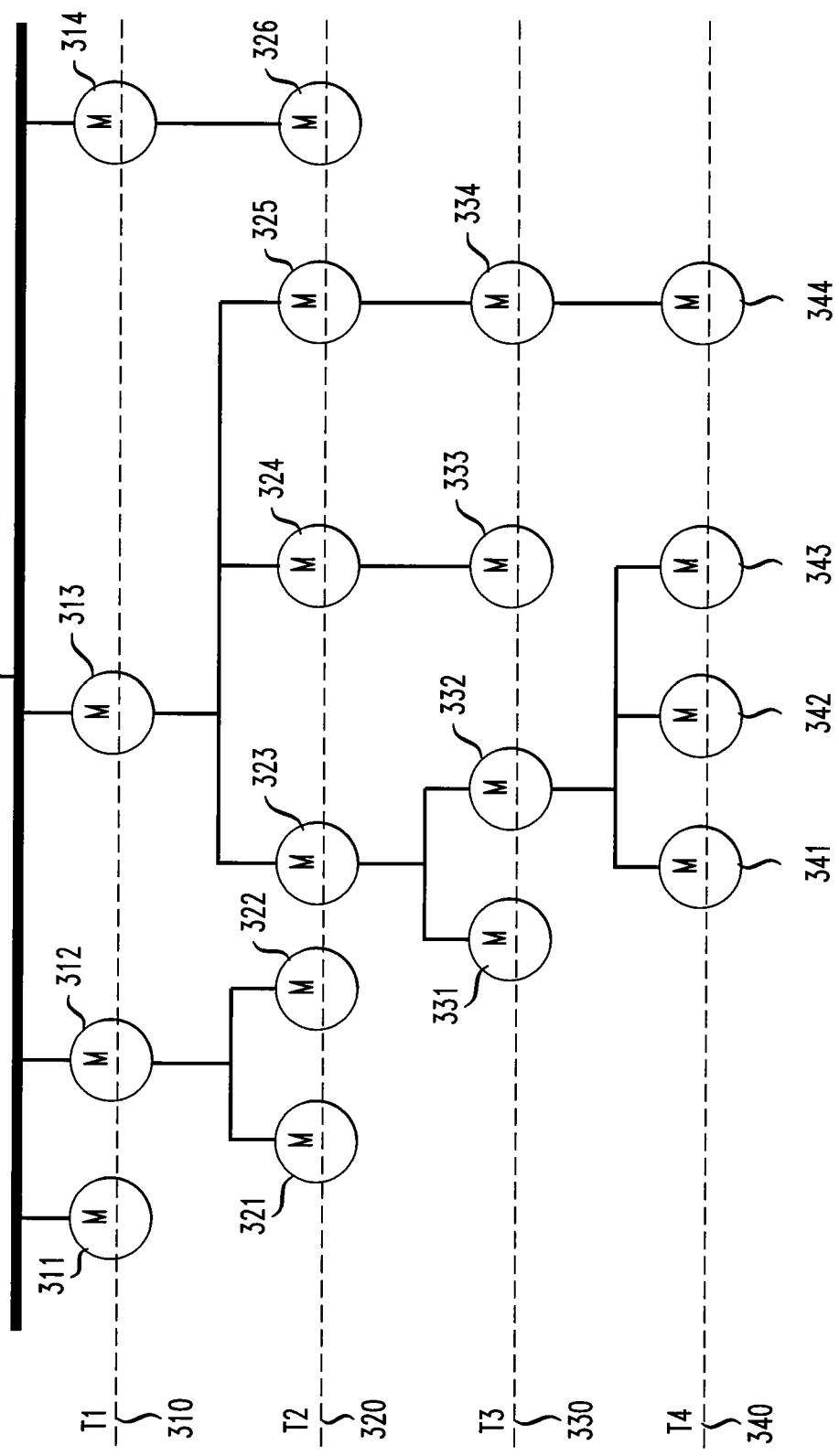
FIG. 3 shows a schematic of a hierarchical architecture of a social network.

Some popular social networks present the details of interactions as a hierarchical relationship between specific members. In FIG. 3, the circles represent specific members, and the solid lines represent personal relationships between them. Member M 301 is the member relative to whom the relationships are referenced. Members shown in FIG. 3 occupy tiers T1 310 (highest tier), T2 320, T3 330, and T4 340 (lowest tier). Members M 311-M 314 occupy tier T1 310. Members M 321-M 326 occupy tier T2 320. Members M 331-M 334 occupy tier T3 330. Members M 341-M 344 occupy tier T4 340. The hierarchy shown in FIG. 3 is not absolute. In general, each member in the social network has an associated hierarchy of personal relationships with specific subsets of other members in the social network. Note that, in general, relative to a specific member, the vast majority of members may have no significant relationship beyond membership in the common social network.

In some social networks, the personal relationships shown in FIG. 3 are characterized by levels of friendship. Members M 311-M 314 in tier T1 310 are friends of M 301. Members M 311-M 314 are directly known by M 301. Member M 301 has a direct relationship, often characterized by a high level of trust, with each of members M 311-M 314. In general, establishing a friendship between two members entails mutual agreement between the two members. For example, initially M 301 invited M 313 to become a friend. M 313 accepted the invitation, and M 301 and M 313 became friends. Note that a member has the option to decline an invitation to form a friendship. As discussed below, friends of a specific member may have access to special privileges not available to other members of the social network.

A member in tier T2 320 is referred to as a friend-of-a-friend of M 301. For example, M 313 is directly known by M 301; therefore, M 313 is a friend of M 301. Member 323 is not directly known by M 301; therefore, M 323 is not a friend of M 301. Member 323 is, however, directly known by M 313; therefore, M 323 is a friend of M 313, and M 323 is a friend-of-a-friend of M 301. Member M 313 is a common friend of M 301 and M 323. Common friends may play significant roles in social networks. For example, M 313 may introduce M 323 to M 301 and ask M 323 to provide assistance to M 301. Similarly, a member in tier T3 330 is a friend-of-a-friend-of-a-friend of M 301.

In general, social networks may support more complex relationships than the example illustrated in FIG. 3. For example, as discussed above, members may be associated in groups. Members of a group are not necessarily associated by levels of friendship. Similarly, members may play games without being associated via friendship or group membership. One skilled in the art may develop embodiments of the invention adapted for arbitrary social relationships that are recorded in the social network.

When a user becomes a member of a social network, the social networking site allocates data storage to the member. Data storage allocated to a member is referred to herein as member data storage. Member data storage, for example, may be blocks of persistent memory on a data storage device such as a network hard drive on application server, such as AS 142 in FIG. 1. A member typically enters member data (information associated with the member) into member data storage, and retrieves member data from member data storage, via a graphical user interface on user equipment, such as UE 112 in FIG. 1. Member data may be displayed on a webpage, commonly referred to as the member's personal webpage. Typically, member data occupies more than one webpage. To simplify the terminology, herein a personal page refers to a set of one or more webpages allocated to the entry and display of the member data of a specific member (the owner of the personal page). Herein, a personal page is associated with a member.

Figure 4:
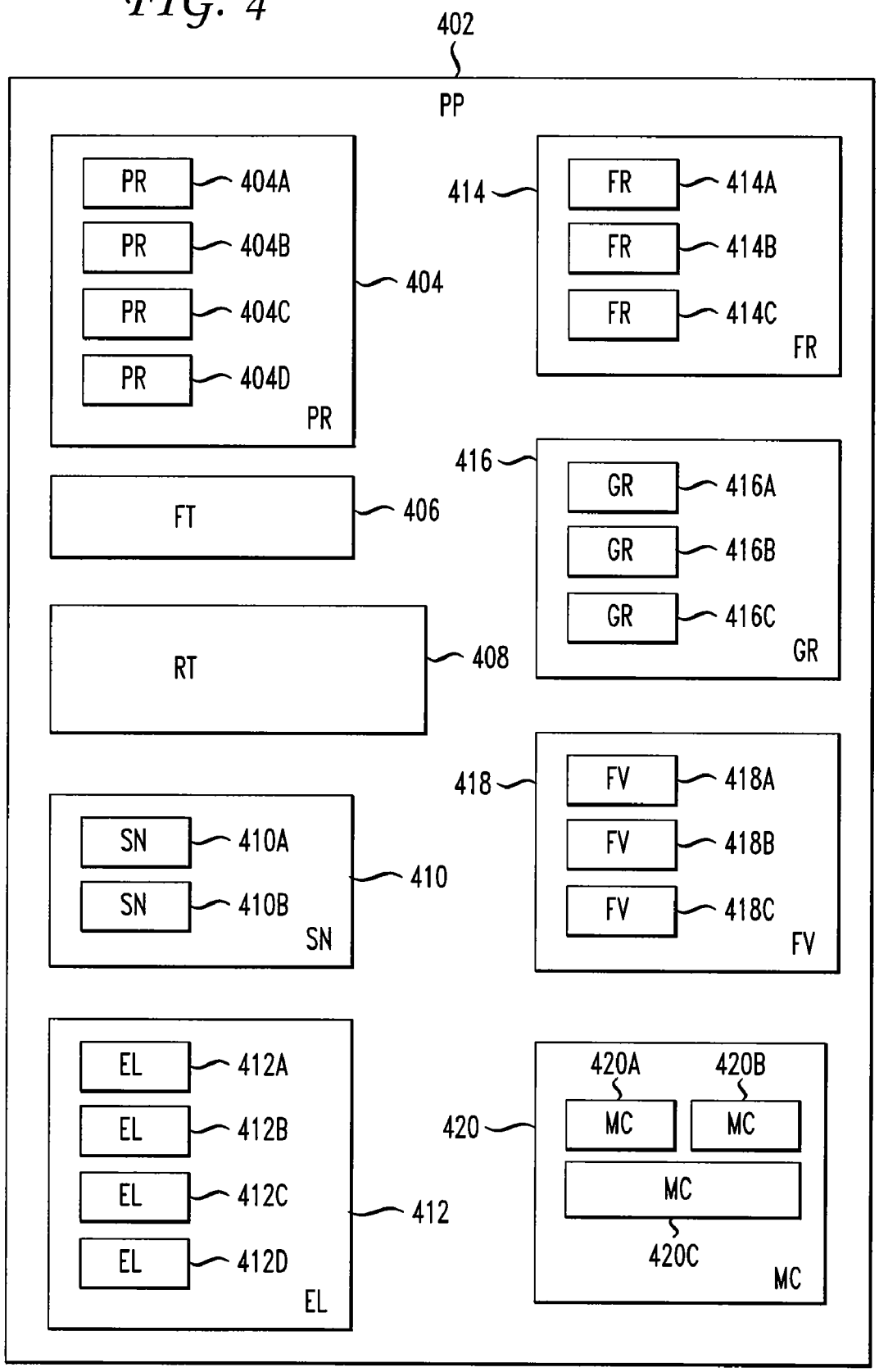
FIG. 4 shows a schematic of a personal page.

FIG. 4 shows a high-level schematic of an example of a personal page, which is displayed on a display, such as a computer monitor connected to user equipment UE 112 in FIG. 1. Personal page PP 402 is organized in multiple fields. The fields shown in PP 402 are examples of fields which may appear on a personal page. One skilled in the art may develop embodiments of the invention adapted for personal pages with various content, fields, structure, and organizations. Fields may contain structured data, unstructured data, or a combination of structured and unstructured data. Field PR 404 contains a structured set of entries commonly referred to as a member profile. Profile entries PR 404A-PR 404D contain basic information about the member, such as name, gender, age, school, occupation, and residence. Field FT 406 contains unstructured data, such as free text in which a member introduces himself and discusses his tastes in music, movies, sports, and hobbies. Field RT 408 contains running text, such as updates on job status, a travel diary, commentaries on news events, and random musings.

Field SN 410 contains the uniform resource locators (URLs) [or other identifiers such as Internet Protocol (IP) addresses] of other social networks to which the member belongs. In this instance, the member belongs to two additional social networks, identified by SN 410A and SN 410B. For example, SN 410A may be a professionally-oriented social network. Field EL 412 contains the external links EL 412A-EL 412D of other websites associated with the member; for example, a home page hosted on another site (independent of social networks), webpages of professional societies, webpages of favorite singers, and webpages of favorite actresses. Field FR 414 contains a structured set of entries which lists the friends (FR 414A-FR 414C) of the member. Field GR 416 contains a structured set of entries which lists the groups (GR 416A-GR 416C) to which the member belongs.

Field FV 418 contains a structured set of entries which lists the favorites (FV 418A-FV 418C) of the member. There may be multiple favorites fields sorted by category, such as "Favorite Places to Visit", "Favorite Foods", "Favorite Restaurants", "Favorite Songs", and "Favorite Movies". Field MC 420 contains multi-media content (MC), which may be structured or unstructured. Multi-media content MC 420A-MC 420C, for example, may include still pictures, audio clips, or video clips. In addition to information directly entered via software provided by the social networking site, fields in PP 402 may also access the output of third-party applications. Third-party applications, for example, may enable a user to provide a list of places visited or a video of a recent vacation trip.

In general, the owner of a personal page may partition information on his personal page into a public partition and a private partition. Information in the public partition may be accessed by any member of the social network. Information in the private partition may be accessed only by members to whom the owner has granted permission. In general, an owner may define specific criteria for access to his private partition. Referring back to FIG. 3, for example, M 301 may permit access to his private partition only to friends M 311-M 314. Access to a private partition may also be restricted, for example, to members of a specific group, student and faculty of a specific university, or employees of a specific corporation. The owner may generate a list of specific members who have access to his private partition. Note that a private partition may be further subdivided. For example, some information may be accessible only to friends. Other information may be accessible only to group members.

In general, a query for specific objective information (for example, "What is the melting point of indium?") expects a definite answer to be returned ("The melting point of indium is 156.6 degrees Celsius."). Such queries are often processed by web search engines. In general, a query for subjective information, however, may not have a definite answer. The query seeks a useful (meaningful) response to be returned. For example, the usefulness of a response to the query "What are interesting sites to visit in the New York City area?" depends on the personal tastes and interests of the member submitting the query. If the member is fond of museums, for example, a useful response may be "Metropolitan Museum of Art, Museum of Modern Art, Guggenheim Museum, and Whitney Museum". If the member is an architect, however, a useful response may be "Empire State Building, Chrysler Building, Flatiron Building, and United Nations Building".

What constitutes a useful response is determined by criteria (in general, subjective) specified by the member submitting the query. Herein, the member submitting the query is referred to as the querier. Retrieving a useful response may entail discussion between the querier and a member responding to the query. Herein, a member responding to the query is referred to as a respondent. A discussion between a querier and a respondent, for example, may clarify the context of the query and establish the personal backgrounds of the querier and respondent. A discussion may be performed by various modes of communication (direct contact), such as e-mail, telephone conversation, instant messaging, or in-person meeting. Note that a respondent may not necessarily have the knowledge to provide a useful response.

In some instances, even a query seeking objective information may not necessarily have a definite answer if the query is open ended. The query then also seeks a useful response to be returned. For example, a useful response to the query "How do I setup a wireless local area network?" will in general depend on the background of the querier and the specific intended application. A useful response for a professional network engineer provisioning a wireless local area network on a campus will differ from a useful response for a novice setting up a wireless router at home. In these instances, a discussion between a querier and a respondent would also be advantageous.

Broadcasting a query to all members of a social network is, in general, prohibited (popular social networks have millions of members). Even if it were allowed, however, a broadcast query would have a low likelihood of yielding a useful response (or any response). Efficiency in retrieving a useful response may be increased by first identifying a set of members who have a high likelihood of providing a useful response. Herein, a member who has a high likelihood of providing a useful response is referred to as a candidate. Herein, a set of candidates may comprise zero, one, or many members. Note that there is no guarantee that a candidate will actually have the knowledge to provide a useful response. A parameter (referred to herein as a score) for characterizing the likelihood that a member may provide a useful response is discussed in further detail below.

Once a set of candidates has been identified, the querier may contact one or more candidates. The chances of getting a response is higher if the candidate is known to the querier. As discussed above, the vast majority of members may have no significant association with a specific querier. Herein, members have a close association if they have a more specific association than mere membership in the common social network. For example, members in the hierarchical tiers of personal relationships (shown in FIG. 3) have a close association. As another example, members in a group have a closer association than those without any other commonality. In general, a querier has a higher likelihood of receiving a response from members with whom he has a close relationship than from members with whom he does not have a close association.

In general, the likelihood of receiving a response increases as the degree of closeness increases. As an example, refer back to the hierarchical tiers of personal relationships shown in FIG. 3. If M 301 is the querier, he has a high likelihood of receiving a response from his friends M 311-M 314 in tier T1 310. He has a lower likelihood of receiving a response from his friends-of-friends M 321-M 326 in tier T2 320. The likelihood of receiving a response, however, from M 323 (for example) may be increased if M 313 (a common friend of M 301 and M 323) specifically requests M 323 to respond to the query. Some social networks have a formal process in which M 301 may request M 313 to introduce M 301 to M 323, thereby increasing the closeness of the association between M 301 and M 323.

Figure 5:
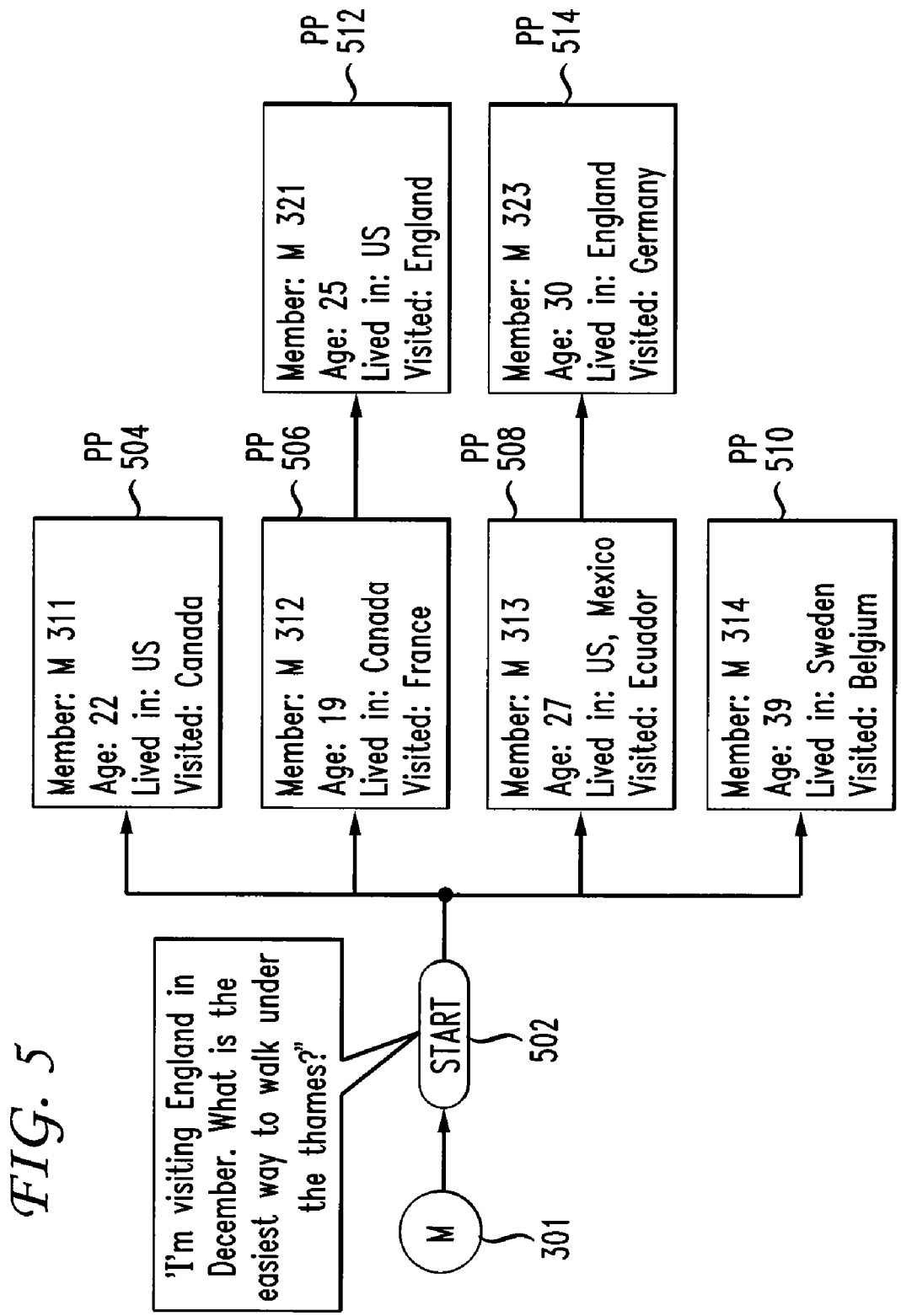
FIG. 5 shows an example of a directed query.

FIG. 5 illustrates a basic manual procedure for receiving a useful response (from members of a social network) to a query submitted by a querier. Referring back to FIG. 3, for example, the querier is M 301, who wants information about England. Querier M 301 submits query 502 ("I'm visiting England in December. What is the easiest way to walk under the Thames?") to his friends M 311-M 314. Information about friends M 311-M 314 are available on their personal pages PP 504-PP 510, respectively. Various modes of message transmission are available on the social networking site. Member M 301, for example, may send an e-mail, containing query 502, to M 311-M 314 via a messaging system on the social networking site. Member M 311 has lived in the US and has visited Canada. He therefore has no experience with England. Furthermore, he has no other friend. Member M 311 sends a reply message back to M 301, "Sorry, I can't help, and I don't know anyone who can."

Member M 312 has lived in Canada and has visited France. He therefore also has no experience with England. Member M 312, however, has a friend M 321 (a friend-of-a-friend of M 301) who has lived in the US and has visited England (as indicated on PP 512). Member M 312 sends a reply message back to M 301, "Sorry, I can't help, but I have a friend who might." Member M 312 forwards query 502 to M 321, along with an attached comment, "My friend M 301 needs some information about England, could you please help him?" Member M 321 sends a reply message back to M 301, "I'm not exactly sure, but you may contact me if you don't find anyone else who can help.", along with a copy to M 312.

Member M 313 has lived in the US and Mexico and has visited Ecuador. He therefore also has no experience with England. Member M 313, however, has a friend M 323 (a friend-of-a-friend of M 301) who has lived in England and has visited Germany (as indicated on PP 514). Member M 313 sends a reply message back to M 301, "Sorry, I can't help, but I have a friend who might." Member M 313 forwards query 502 to M 323, along with an attached comment, "My friend M 301 needs some information about England, could you please help him?" Member M 323 sends a reply message back to M 301, "It's a bit tricky and hard to explain. Please call me.", along with a copy to M 313. With respect to the information sought in query 502, M 323 may be more likely to provide a useful response than M 321. Member M 314 is on vacation and does not respond to the query 502. Therefore, M 301 calls M 323.

In an embodiment, identification of a set of candidates may be automated. Referring back to the example in FIG. 5, querier M 301 enters query 502 into a query engine (not shown). More details of a query engine are discussed below. The query engine examines the personal pages PP 504-PP 510 of M 311-M 314, respectively. The query engine examines PP 504 and retrieves information relevant to the query 502 (places lived in and places visited). The query engine further examines PP 504 for a list of additional friends (that is, friends in addition to M 301). In this instance, M 311 has no additional friends. The query engine examines PP 506 and retrieves information relevant to the query 502 (places lived in and places visited). The query engine further examines PP 506 for a list of additional friends. In this instance, the query engine finds M 321 on the list of additional friends. The query engine then examines the personal page PP 512 of M 321 and retrieves information relevant to the query 502 (places lived in and places visited).

The query engine examines PP 508 and retrieves information relevant to the query 502 (places lived in and places visited). The query engine further examines PP 508 for a list of additional friends. In this instance, the query engine finds M 323 on the list of additional friends. The query engine then examines the personal page PP 514 of M 323 and retrieves information relevant to the query 502 (places lived in and places visited). The query engine examines PP 510 and retrieves information relevant to the query 502 (places lived in and places visited). The query engine further examines PP 510 for a list of additional friends. In this instance, M 314 has no additional friends.

The query engine then processes the retrieved information (places lived in and places visited for each of members M 311-M 314, M 321, and M 323) and determines that M 323 is the best candidate (candidate most likely to provide a useful response to the query 502). Since M 323 is not a friend of M 301, M 301 then e-mails query 502 to his friend M 313 and asks M 313 to forward the query to his friend M 323. Candidate M 323 then sends a reply e-mail back to querier M 301, "Yes, I can help. Please call me."

A query engine comprises a set of processes for generating a set of candidates to respond to a query. The input to the query engine is a query received from a querier. The output of the query engine is a set of candidates, whom the querier may then contact in an attempt to receive a useful response to the query. As noted above, however, in some instances, the set of candidates may be empty. Furthermore, in some instances, even if some candidates have been identified, there may in fact be no one who has the knowledge to provide a useful response. In an embodiment, if a candidate is not a friend of the querier, the query engine notifies a common friend of the querier and the candidate. The common friend may then request the candidate to respond to the query, thereby increasing the likelihood that the querier receives a response from the candidate.

A query engine may be implemented by application software, herein referred to as query engine software, loaded on network servers, such as AS 142-AS 146, or user equipment, such as UE 112-UE 118 (refer to FIG. 1). Query engine software may also be loaded on both network servers and user equipment. In an embodiment, query engine software is loaded on servers belonging to a third-party service provider and is accessible to the querier as an application within the social networking site. In another embodiment, query engine software is loaded on the application server (or set of application servers) which hosts the social networking site. Herein, a person who has access permission to program the query engine is referred to as the query engine administrator (QEA).

Query engine software may be integrated with the application software supporting the social networking site. To a member, the query engine then appears as a query service provided by the social networking site. To use the query service, members may subscribe to the query service. That is, by default, the query service is turned off, and members may opt in. In an embodiment, a subscriber accesses the query service via a graphical user interface and submits the query by typing it into a field. The query service may provide a subscriber with additional configurable fields. For example, a subscriber may enter a list of members (such as a list of friends or a list of group members) from whom he will accept a query. As another example, a subscriber may enter a list of members (such as a list of friends or a list of group members) who may access his private partition during the query service. Other configurable fields are discussed below.

Figure 6:
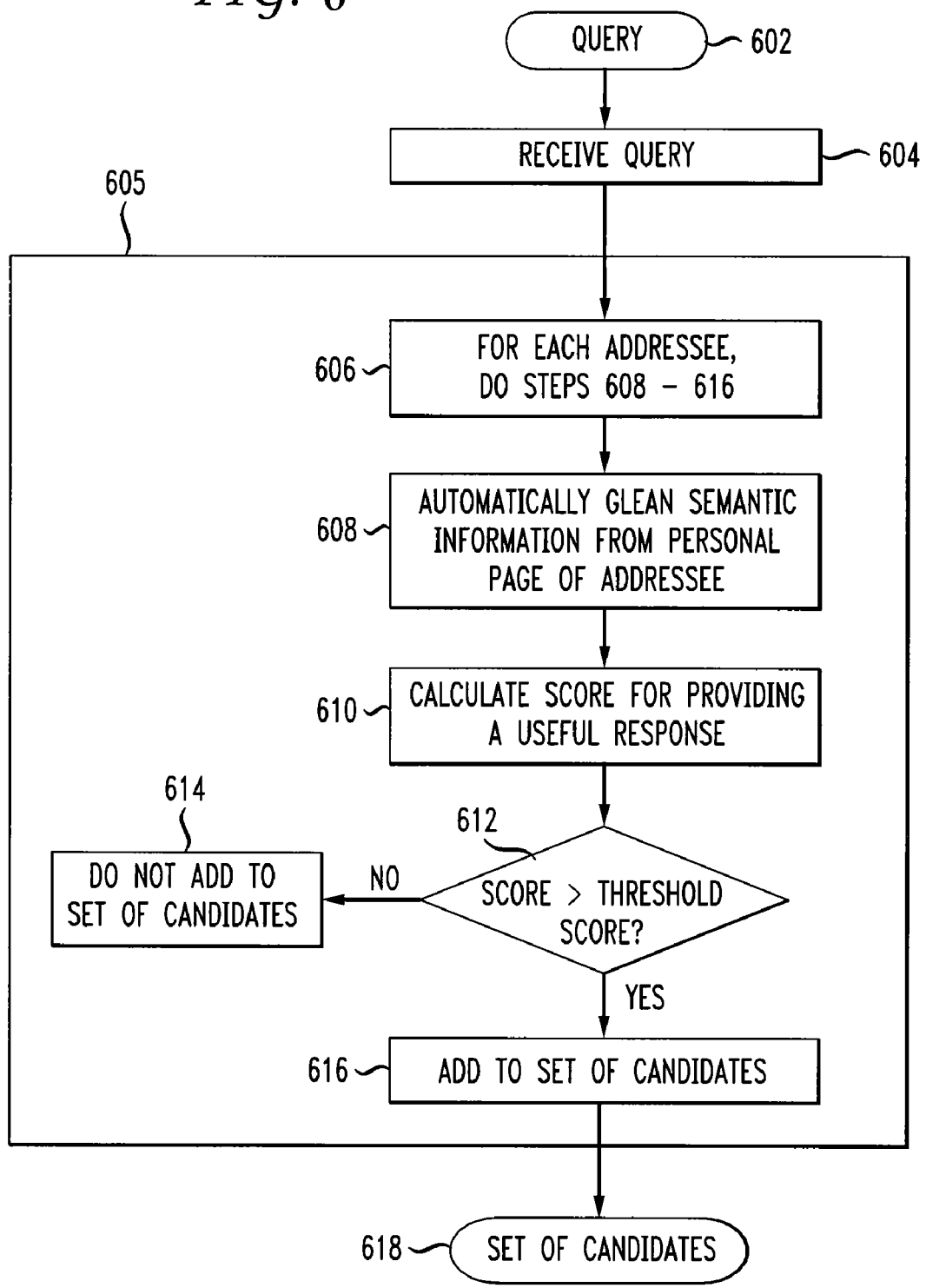
FIG. 6 shows a flowchart of steps for generating a set of candidates from personal pages of a set of addressees.
Figure 7:
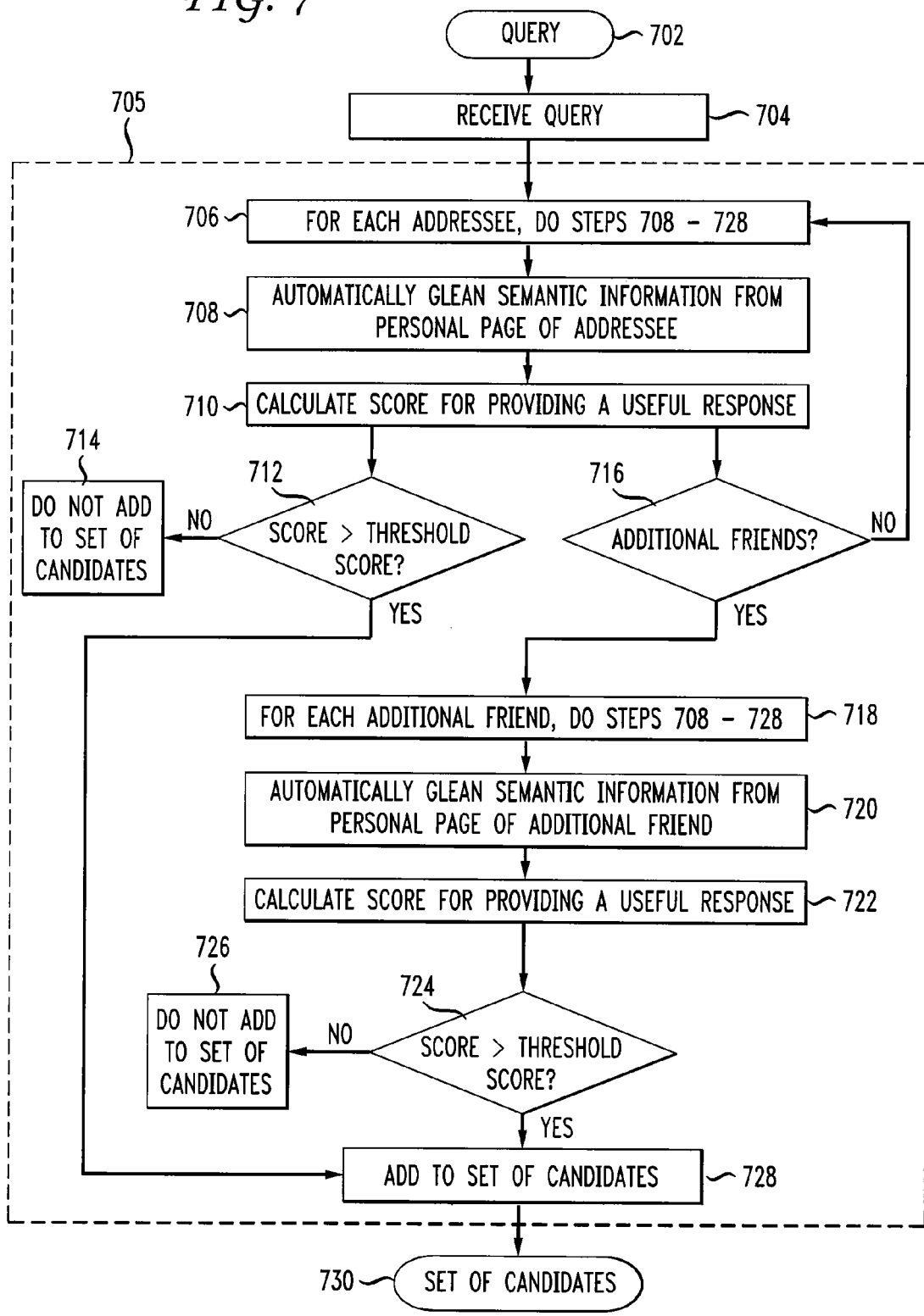
FIG. 7 shows a flowchart of steps for generating a set of candidates from personal pages of a set of addressees and additional friends.
Figure 8:
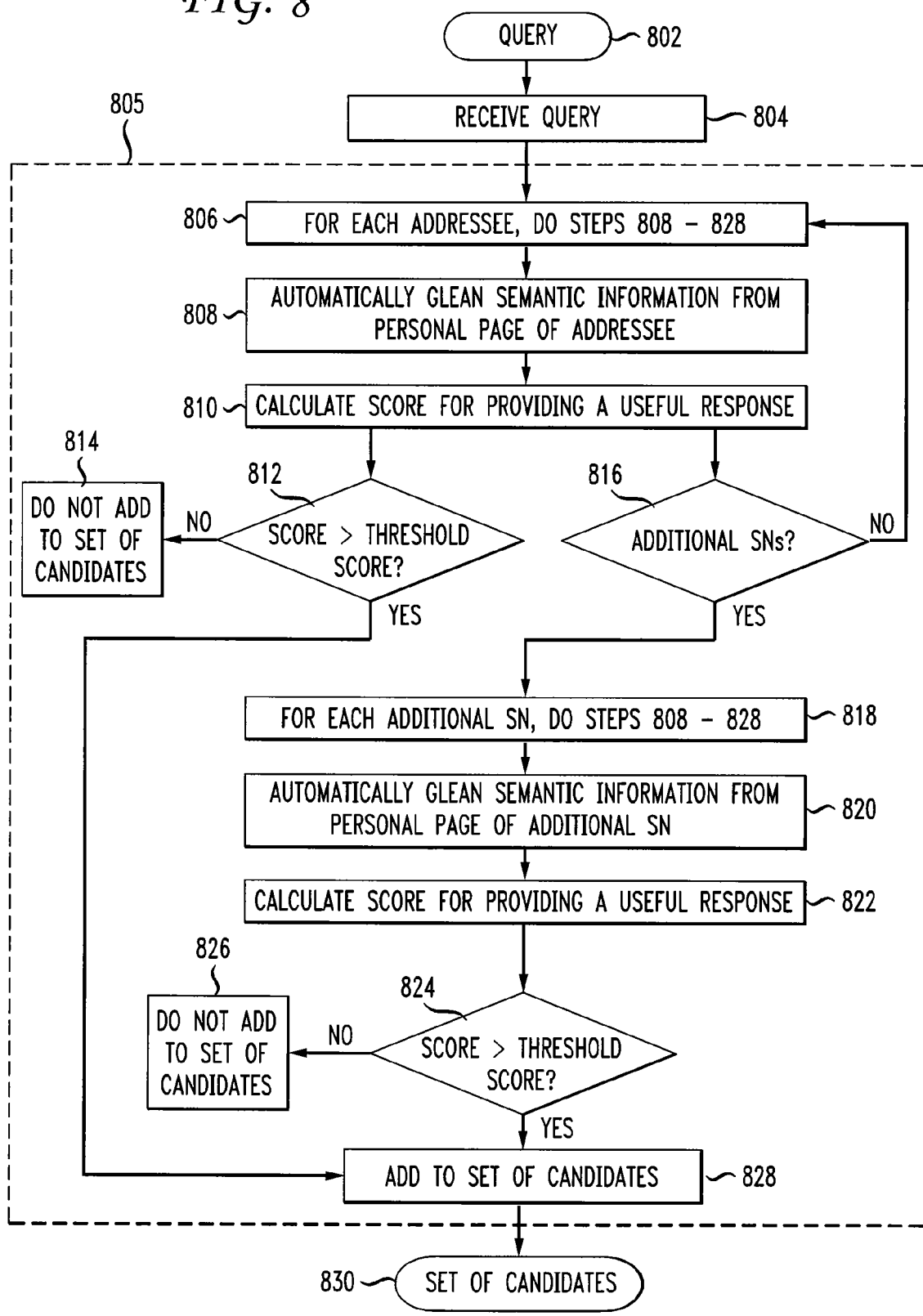
FIG. 8 shows a flowchart of steps for generating a set of candidates from personal pages on two social networks.

FIG. 6-FIG. 8 show flowcharts of steps for generating a candidate list, according to embodiments of the invention. In FIG. 6, the personal pages of addressees on one social network are examined. In FIG. 7, the personal pages of addressees and additional friends on one social network are examined. In FIG. 8, the personal pages of addressees on two social networks are examined.

In FIG. 6, the personal pages of addressees on one social network are examined. Addressees are members whose personal pages are initially examined. In step 604, a query engine receives the query 602, which is submitted by a querier (such as member M 301 in FIG. 3). The steps in block 605 are then performed. In step 606, for each addressee in a set of addressees, step 608-step 616 are performed. The set of addressees may be specified via various mechanisms. The set of addressees may be a predetermined set of addressees. For example, the QEA may program the default set to be all friends of the querier. The querier may also enter the set in a configurable field in the query service. For example, if the query concerns chess, the querier may specify members of the chess club group. As noted above, members of a group are not necessarily friends. The querier may also enter a set of specific individual addressees. One skilled in the art may develop algorithms for dynamically determining a set of addressees based on the content of the query. For example, if the query concerns chess, the query engine may automatically add members of the chess club group to the default set of friends.

In step 608, the query engine examines the personal page associated with an addressee and automatically gleans semantic information relevant to the query. The semantic information is interpreted in the context of the specific query 602, and is gleaned (retrieved) from various fields on the personal page. Herein, semantic information automatically gleaned from various fields on a personal page is referred to as semantic information automatically gleaned from a personal page. In the examples below, refer to personal page PP 402 in FIG. 4. In general, the query engine may examine all fields on the personal page. In an embodiment, the query engine examines a subset of fields on the personal page. The subset may be specified by the querier or programmed into the query engine by the QEA. One skilled in the art may develop algorithms for the query engine to automatically specify the subset of the fields based on the content of the query 602. For example, if the query 602 is "What is a good Italian restaurant in New York City?", the query engine may examine only structured fields (field FV 418) in the favorites categories "Places Lived", "Places Visited", "Favorite Foods", and "Favorite Restaurants".

As discussed above, in general, the query engine may examine all fields. For example, relevant semantic information may also be gleaned from a travel diary in the field RT 408 ["I just came back from a week's vacation in New York. Jen took me to this homey restaurant named Luigi's in Little Italy. Best osso buco I've ever had. Pricey, but well worth it. Try it if you're ever in the area."] Entry EL 412A in field EL 412 may be an external link to the home page of a restaurant. Entry GR 416A in field GR 416 may be a group dedicated to the enjoyment of Italian cuisine. Entry MC 420C in field MC 420 may be a video providing a restaurant tour. The video may be provided as the output of a third-party application. One skilled in the art may develop appropriate algorithms for automatically gleaning semantic information relevant to the query.

In step 610, the semantic information automatically gleaned from the associated personal page is processed, and a score characterizing the likelihood that the addressee may provide a useful response is calculated. One skilled in the art may develop appropriate algorithms for calculating a score. For example, in one embodiment, the score may refer to a statistical probability. In another embodiment, a score may be the simple sum of the number of fields on a personal page (such as PP 402) in which relevant information is found. Different weights may also be applied to specific fields. For example, higher weight may be placed on information in the favorites field FV 418 than on information in the multi-media content field MC 420. For the query 602, "What is a good Italian restaurant in New York City?", for example, higher weight may be assigned to a list of favorite restaurants in FV 418 than to a video tour of restaurants in MC 420.

One skilled in the art may develop algorithms for calculating a score which take into account various other factors. For example, the degree of relevancy of the information in a specific field may be characterized. As another example, an algorithm may compare the semantic information automatically gleaned from the personal page of an addressee with corresponding semantic information automatically gleaned from the personal page of the querier. For example, assume the querier is a gourmet. Then an addressee whose "Favorite Restaurants" category includes a list of 4-star restaurants, and whose travel diary indicates a penchant for exotic foods, would be more likely to provide a useful response than an addressee whose "Favorite Restaurants" category includes a list of fast-food joints, and whose travel diary dwells on hot dogs and hamburgers.

In step 612, the score calculated in step 610 is compared to a threshold score (which may be zero). One skilled in the art may develop appropriate algorithms for determining a threshold score. For example, a threshold score may be determined heuristically from historical experience. If the score does not exceed the threshold score, then the process passes to step 614, and the addressee is not added to a set of candidates. If the score does exceed the threshold score, then the process passes to step 616, and the addressee is added to a set of candidates. Once all the steps in block 605 have been performed, the final set of candidates 618 is generated. The set of candidates 618 may contain zero, one, or many addressees. If more than one candidate is identified, the query engine may return the candidate with the highest score (most likely to provide a useful response), or it may return a list of candidates rank-ordered by score. In an embodiment, the query engine may simply return a list of all the addressees and their associated scores.

In the embodiment shown in FIG. 6, the process continues until all addressees have been evaluated. In another embodiment, the process may terminate once a candidate with a very high score has been identified. For example, if the threshold score is 75 (out of a possible 100), the process may terminate once a candidate with a score of 95 has been identified.

In FIG. 7, the personal pages of addressees and additional friends in one social network are examined. In step 704, a query engine receives the query 702, which is submitted by a querier. The steps in block 705 are then performed. In step 706, for each addressee in a set of addressees, step 708-step 728 are performed. In step 708, the query engine examines the personal page associated with an addressee and automatically gleans semantic information relevant to the query. In step 710, the semantic information automatically gleaned from the associated personal page is processed, and a score is calculated. In step 712, the score calculated in step 710 is compared to a threshold score. If the score does not exceed the threshold score, then the process passes to step 714, and the addressee is not added to a set of candidates. If the score does exceed the threshold score, then the process passes to step 728, and the addressee is added to a set of candidates.

The process then passes to step 716, in which the query engine inspects the friends list (field FR 414 on the personal page PP 402 of the addressee) for additional friends. An additional friend is a friend other than the querier. If no additional friends are found, then the process returns to step 706, and the personal page of the next addressee is examined. If at least one additional friend is found, then the process passes to step 718, in which step 720-step 728 are performed for each additional friend. In step 720, the query engine examines the personal page associated with an additional friend and automatically gleans semantic information relevant to the query. In step 722, the semantic information automatically gleaned from the associated personal page is processed, and a score for the additional friend is calculated. In step 724, the score calculated in step 722 is compared to the threshold score. If the score does not exceed the threshold score, then the process passes to step 726, and the additional friend is not added to a set of candidates. If the score does exceed the threshold score, then the process passes to step 728, and the additional friend is added to a set of candidates. Once all the steps in block 705 have been performed, the final set of candidates 730 is generated.

In FIG. 8, the personal pages of addressees on two social networks are examined. In step 804, a query engine receives the query 802, which is submitted by a querier. The steps in block 805 are then performed. In step 806, for each addressee in a set of addressees, step 808-step 828 are performed. In step 808, the query engine examines the personal page associated with an addressee and automatically gleans semantic information relevant to the query. In step 810, the semantic information automatically gleaned from the associated personal page is processed, and a score is calculated. In step 812, the score calculated in step 810 is compared to a threshold score. If the score does not exceed the threshold score, then the process passes to step 814, and the addressee is not added to a set of candidates. If the score does exceed the threshold score, then the process passes to step 828, and the addressee is added to a set of candidates.

The process then passes to step 816, in which the query engine inspects the social networks (SNs) list (field SN 410 on the personal page PP 402 of the addressee) for additional social networks to which the addressee belongs. If no additional social network is found, then the process returns to step 806, and the personal page of the next addressee is examined. If at least one additional social network is found, then the process passes to step 818, in which step 820-step 828 are performed for each additional social network. In step 820, the query engine examines the personal page associated with the addressee in an additional social networking site associated with the additional social network and automatically gleans semantic information relevant to the query. In step 822, the semantic information automatically gleaned from the associated personal page is processed, and a score is calculated. In step 824, the score calculated in step 822 is compared to the threshold score. If the score does not exceed the threshold score, then the process passes to step 826, and the addressee is not added to a set of candidates. If the score does exceed the threshold score, then the process passes to step 828, and the addressee is added to a set of candidates. Once all the steps in block 805 have been performed, the final set of candidates 830 is generated.

Other embodiments may expand upon the steps shown in FIG. 7 and FIG. 8. For example, the personal page of a friend-of-a-friend of an addressee in the first social network may be examined. As another example, if the personal page of an addressee on a second social network is examined, the personal page of a friend of the addressee in the second social network may also be examined. Stopping conditions may be specified to limit the set of personal pages examined. For example, a maximum number of tiers (refer to FIG. 3) may be specified. As another example, a maximum number of social networks may be specified. One skilled in the art may develop algorithms in which the score depends on the closeness of association between the member and the querier; for example, whether the member is a friend, friend-of-a-friend, or a group member. One skilled in the art may develop algorithms in which the score depends on the social network which is the source of the automatically-gleaned semantic information; for example, whether the information is retrieved from the original social network (in which the query was initially submitted) or from additional social networks.

Once a set of candidates has been generated, the querier may contact a candidate by various methods. For example, the querier may contact the candidate directly if the candidate is a friend of the querier. If the candidate is a friend-of-a-friend of the querier, the querier may first contact the common friend to introduce the querier to the candidate. In an embodiment, the query engine may automatically forward the query to the highest-ranked candidate (with appropriate annotations such as the name of the common friend).

Figure 9:
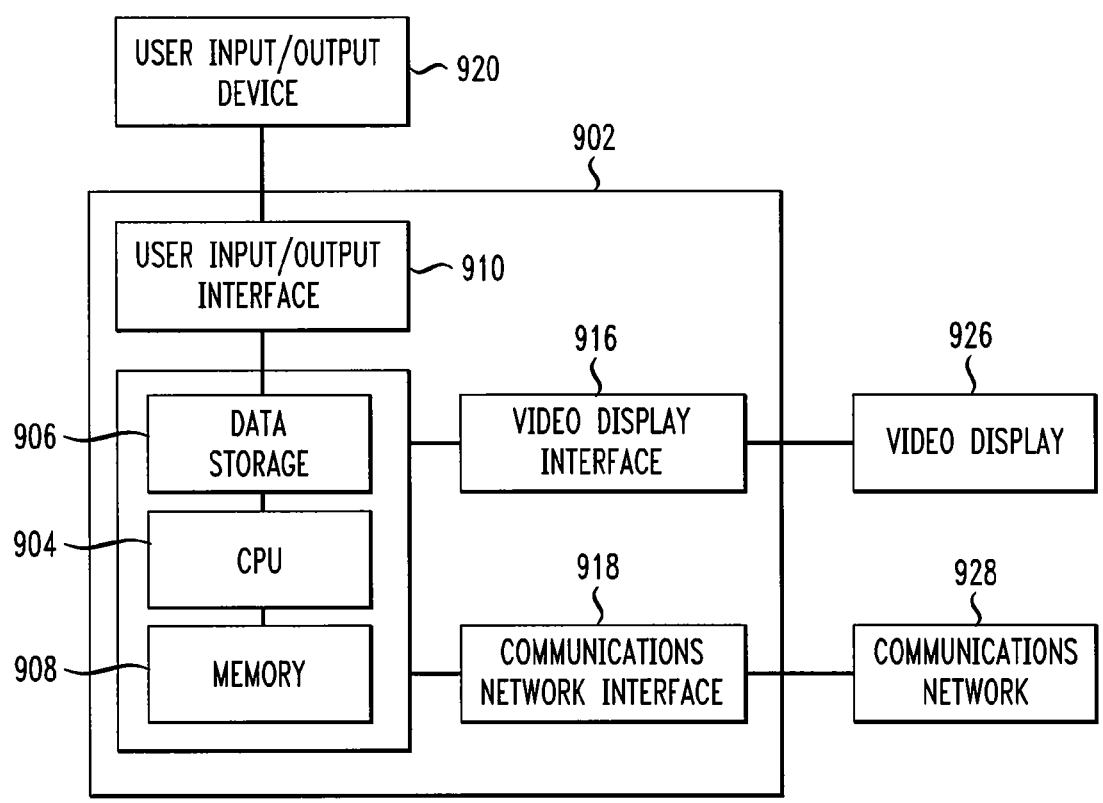
FIG. 9 shows a high-level schematic of a computer.

One embodiment of a query engine may be implemented using a computer. The steps shown in the flowcharts in FIG. 6-FIG. 8 may be executed using a computer. An example of a computer implementing a query engine is application server AS 142 (FIG. 1), which has query engine software loaded on it. As shown in FIG. 9, computer 902 may be any type of well-known computer comprising a central processing unit (CPU) 904, memory 908, data storage 906, and user input/output interface 910. Data storage 906 may comprise a hard drive or non-volatile memory. User input/output interface 910 may comprise a connection to a user input device 920, such as a keyboard or mouse. As is well known, a computer operates under control of computer software which defines the overall operation of the computer and applications. CPU 904 controls the overall operation of the computer and applications by executing computer program instructions which define the overall operation and applications. The computer program instructions may be stored in data storage 906 and loaded into memory 908 when execution of the program instructions is desired. Computer 902 may further comprise a video display interface 916, which may transform signals from CPU 904 to signals which may drive video display 926. Computer 902 may further comprise one or more network interfaces. For example, communications network interface 918 may comprise a connection to an Internet Protocol (IP) communications network 928 (such as communications network 102 in FIG. 1), which may transport user traffic and network administration traffic. Computers are well known in the art and will not be described in detail herein.

Disclosed herein is the following:

A computer readable medium storing computer program instructions for generating a set of candidates who may provide at least one useful response to a query submitted by a querier in a first social networking site associated with a first social network, said computer program instructions defining the steps of:
  receiving the query;
  automatically gleaning semantic information from a first personal page in the first social networking site, said first personal page associated with a member of the first social network;
  calculating a first score based at least in part on the semantic information automatically gleaned from the first personal page; and
  adding the member to the set of candidates based at least in part on said calculated first score.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a set of candidates who may provide a useful response to a query submitted by a querier in a first social networking site associated with a first social network, comprising:
  receiving the query;
  automatically gleaning semantic information from a first personal page in the first social networking site, the first personal page associated with a member of the first social network;
  calculating a first score based on the semantic information automatically gleaned from the first personal page, the semantic information being relevant to the query and associated with a plurality of fields on the first personal page, wherein calculating the first score comprises:
    assigning a value to each of the plurality of fields on the first personal page based on relevance to the query of information contained in each of the plurality of fields on the first personal page, wherein a value of one of the plurality of fields on the first personal page is not equal to a value of one other of the plurality of fields on the first personal page, and
    calculating a sum of values of the plurality of fields on the first personal page;
  adding the member to the set of candidates based on the first score;
  finding a uniform resource locator on the first personal page identifying a second personal page associated with the member in a second social networking site;
  automatically gleaning semantic information from the second personal page;
  calculating a second score based on the semantic information automatically gleaned from the second personal page, wherein calculating the second score comprises:
    assigning a value to each of a plurality of fields on the second personal page based on relevance to the query of information contained in each of the plurality of fields on the second personal page, wherein a value of one of the plurality of fields on the second personal page is not equal to a value of one other of the plurality of fields on the second personal page, and
    calculating a sum of values of the plurality of fields on the second personal page;
  adding the member to the set of candidates based on the second score; and
  automatically sending an email message containing the query to the set of candidates.

2. The method of claim 1, wherein adding the member to the set of candidates based on the calculated first score comprises:
    comparing the first score to a threshold score; and
    adding the member to the set of candidates when the first score is greater than the threshold score.
3. The method of claim 1, further comprising:
    rank-ordering the set of candidates based on the first score associated with each specific candidate in the set of candidates.
4. The method of claim 1, wherein the member is an addressee in a set of addressees.
5. The method of claim 4, wherein the set of addressees is based on the query.
6. The method of claim 4, wherein the set of addressees is a predetermined set of addressees.
7. The method of claim 6, wherein the predetermined set of addressees comprises at least one of:
    a set of friends associated with the querier;
    a group associated with the querier; and
    a set of specific addressees specified by the querier.
8. The method of claim 4, further comprising:
    for each of the specific addressees in the set of addressees:
        automatically gleaning semantic information from the first personal page associated with the specific addressee;
        calculating the first score associated with the specific addressee, the first score based on the semantic information automatically gleaned from the first personal page associated with the specific addressee; and
        adding the specific addressee to the set of candidates based on the first score associated with the specific addressee.
9. The method of claim 1, further comprising:
    finding an additional friend on the first personal page associated with the member;
    automatically gleaning semantic information from a third personal page, the third personal page associated with the additional friend;
    calculating a third score based on the semantic information automatically gleaned from the third personal page, wherein calculating the third score comprises:
        assigning a value to each of a plurality of fields on the third personal page based on relevance to the query of information contained in each of the plurality of fields on the third personal page, wherein a value of one of the plurality of fields on the third personal page is not equal to a value of one other of the plurality of fields on the third personal page, and
        calculating a sum of values of the plurality of fields on the third personal page; and
    adding the additional friend to the set of candidates based on the third score.
10. An apparatus for generating a set of candidates who may provide a useful response to a query submitted by a querier in a first social networking site associated with a first social network, comprising:
    means for receiving the query;
    means for automatically gleaning semantic information from a first personal page in the first social networking site, the first personal page associated with a member of the first social network;
    means for calculating a first score based on the semantic information automatically gleaned from the first personal page, the semantic information being relevant to the query and associated with a plurality of fields on the first personal page, wherein calculating the first score comprises:
        assigning a value to each of the plurality of fields on the first personal page based on relevance to the query of information contained in each of the plurality of fields on the first personal page, wherein a value of one of the plurality of fields on the first personal page is not equal to a value of one other of the plurality of fields on the first personal page, and
        calculating a sum of values of the plurality of fields on the first personal page;
    means for adding the member to the set of candidates based on the first score;
    means for finding a uniform resource locator on the first personal page identifying a second personal page associated with the member in a second social networking site;
    means for automatically gleaning semantic information from the second personal page;
    means for calculating a second score based on the semantic information automatically gleaned from the second personal page, wherein calculating the second score comprises:
        assigning a value to each of a plurality of fields on the second personal page based on relevance to the query of information contained in each of the plurality of fields on the second personal page, wherein a value of one of the plurality of fields on the second personal page is not equal to a value of one other of the plurality of fields on the second personal page, and
        calculating a sum of values of the plurality of fields on the second personal page;
    means for adding the member to the set of candidates based the second score; and
    means for automatically sending an email message containing the query to the set of candidates.
11. The apparatus of claim 10, wherein the means for adding the member to the set of candidates based on the first score comprises:
    means for comparing the first score to a threshold score; and
    means for adding the member to the set of candidates when the first score is greater than the threshold score.
12. The apparatus of claim 10, further comprising:
    means for rank-ordering the set of candidates based on the first score associated with each candidate in the set of candidates.
13. The apparatus of claim 10, wherein the member is an addressee in a set of addressees.
14. The apparatus of claim 13, further comprising:
    means for automatically gleaning semantic information from the first personal page associated with each specific addressee in the set of addressees;
    means for calculating the first score associated with each specific addressee, the first score based on the semantic information automatically gleaned from the first personal page associated with each specific addressee; and
    means for adding each specific addressee to the set of candidates based on the first score associated with each specific addressee.
15. The apparatus of claim 10, further comprising:
    means for finding an additional friend on the first personal page associated with the member;

means for automatically gleaning semantic information from a third personal page in the first social networking site, the third personal page associated with the additional friend;

means for calculating a third score based on the semantic information automatically gleaned from the third personal page; and means for adding the additional friend to the set of candidates based the third score.

16. A non-transitory computer readable medium storing computer program instructions for generating a set of candidates who may provide a useful response to a query submitted by a querier in a first social networking site associated with a first social network, the computer program instructions defining:

receiving the query;

automatically gleaning semantic information from a first personal page in the first social networking site, the first personal page associated with a member of the first social network;

calculating a first score based on the semantic information automatically gleaned from the first personal page, the semantic information being relevant to the query and associated with a plurality of fields on the first personal page, wherein calculating the first score comprises:

assigning a value to each of the plurality of fields on the first personal page based on relevance to the query of information contained in each of the plurality of fields on the first personal page, wherein a value of one of the plurality of fields on the first personal page is not equal to a value of one other of the plurality of fields on the first personal page, and calculating a sum of values of the plurality of fields on the first personal page;

adding the member to the set of candidates based on the first score;

finding a uniform resource locator on the first personal page identifying a second personal page associated with the member in a second social networking site;

automatically gleaning semantic information from the second personal page;

calculating a second score based on the semantic information automatically gleaned from the second personal page, wherein calculating the second score comprises:

assigning a value to each of the plurality of fields on the second personal page based on relevance to the query of information contained in each of the plurality of fields on the second personal page, wherein a value of one of the plurality of fields on the second personal page is not equal to a value of one other of the plurality of fields on the second personal page, and calculating a sum of values of the plurality of fields on the second personal page;

adding the member to the set of candidates based on the calculated second score; and automatically sending an email message containing the query to the set of candidates.

17. The non-transitory computer readable medium of claim 16, wherein the computer program instructions defining adding the member to the set of candidates based on the first score comprise computer instructions defining:

comparing the first score to a threshold score; and adding the member to the set of candidates when the first score is greater than the threshold score.

18. The non-transitory computer readable medium of claim 16, wherein the computer program instructions for generating a set of candidates who may provide the useful response to a query submitted by a querier in a first social networking site associated with a first social network further comprise computer instructions defining:

rank-ordering the set of candidates based on the first score associated with each specific candidate in the set of candidates.

19. The non-transitory computer readable medium of claim 16, wherein the member is an addressee in a set of addressees.

20. The non-transitory computer readable medium of claim 19, wherein the computer program instructions for generating a set of candidates who may provide the useful response to a query submitted by a querier in a first social networking site associated with a first social network further comprise computer instructions defining:

for each of the specific addressees in the set of addressees:

automatically gleaning semantic information from the first personal page associated with the specific addressee;

calculating the first score associated with the specific addressee, the first score based on the semantic information automatically gleaned from the first personal page associated with the specific addressee; and adding the specific addressee to the set of candidates based on the first score associated with the specific addressee.

21. The non-transitory computer readable medium of claim 19, wherein the computer program instructions for generating a set of candidates who may provide the useful response to a query submitted by a querier in a first social networking site associated with a first social network further comprise computer instructions defining:

finding an additional friend on the first personal page associated with the member;

automatically gleaning semantic information from a third personal page on the first social networking site, the third personal page associated with the found the additional friend;

calculating a third score based on the semantic information automatically gleaned from the third personal page; and adding the additional friend to the set of candidates based on the third score.

* * * * *